United States Patent
Jodet et al.

(10) Patent No.: US 8,881,502 B2
(45) Date of Patent: Nov. 11, 2014

(54) MIXER THAT PERFORMS RECIPROCATING ROTARY MOTION FOR A CONFLUENT-FLOW NOZZLE OF A TURBINE ENGINE, AND A METHOD OF CONTROLLING IT

(71) Applicant: SNECMA, Paris (FR)

(72) Inventors: Norman Jodet, Savigny-sur-Orge (FR); Guillaume Bodard, Verneuil L'Etang (FR); Cyprien Georges Eric Henry, Paris (FR); Maxime Koenig, Brunoy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/035,113

(22) Filed: Sep. 24, 2013

(65) Prior Publication Data

US 2014/0090359 A1     Apr. 3, 2014

(30) Foreign Application Priority Data

Oct. 1, 2012     (FR) ...................................... 12 59281

(51) Int. Cl.
*F02K 1/38* (2006.01)
*F02K 1/34* (2006.01)
*F02K 1/48* (2006.01)

(52) U.S. Cl.
CPC .... *F02K 1/34* (2013.01); *F02K 1/48* (2013.01)
USPC ............................................. 60/262; 60/39.5

(58) Field of Classification Search
CPC .................................. F02K 1/825; F02K 1/827
USPC ............... 60/226.1, 770, 771, 39.5, 262, 264; 239/265.17; 181/220
See application file for complete search history.

(56) References Cited

U.S. PATENT DOCUMENTS

| | | | | |
|---|---|---|---|---|
| 3,060,681 A * | 10/1962 | Morley et al. | ............... | 239/127.3 |
| 3,514,955 A * | 6/1970 | Judge et al. | ..................... | 60/262 |
| 3,524,588 A * | 8/1970 | Duval | ...................... | 239/265.13 |
| 3,780,827 A * | 12/1973 | Straight | ........................ | 181/216 |
| 3,910,375 A * | 10/1975 | Hache et al. | .................. | 181/215 |
| 4,335,573 A * | 6/1982 | Wright | ............................ | 60/762 |
| 8,215,096 B2 * | 7/2012 | Lundbladh et al. | ............. | 60/229 |
| 2010/0018213 A1 | 1/2010 | Migliaro, Jr. | | |

FOREIGN PATENT DOCUMENTS

| | | |
|---|---|---|
| DE | 10 2006 019 299 B3 | 11/2007 |
| DE | 10 2010 014 910 A1 | 10/2011 |
| GB | 2 372 779 A | 9/2002 |
| WO | WO 2007/122368 A1 | 11/2007 |
| WO | WO 2008/045090 A1 | 4/2008 |

OTHER PUBLICATIONS

French Preliminary Search Report issued Dec. 19, 2012, in French Application No. 12 59281 filed Oct. 1, 2012 (with English Translation of Categories of Cited Documents).

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

A mixer for a confluent-flow nozzle of a turbine engine is provided. The mixer includes: an annular cap designed to be centered on a longitudinal axis of the nozzle and having a stationary upstream portion and a downstream portion that is movable in rotation about the longitudinal axis relative to the stationary portion, the movable portion of the cap terminating at its downstream end in inner lobes alternating circumferentially with outer lobes; and a mechanism which imparts reciprocating rotary motion to the movable portion of the cap.

13 Claims, 2 Drawing Sheets

MIXER THAT PERFORMS RECIPROCATING ROTARY MOTION FOR A CONFLUENT-FLOW NOZZLE OF A TURBINE ENGINE, AND A METHOD OF CONTROLLING IT

BACKGROUND OF THE INVENTION

The present invention relates to the general field of mixers for mixing concentric gas streams from a bypass turbine engine. The invention relates more particularly to a daisy-type mixer for a confluent-flow nozzle.

Sound pollution has nowadays become one of the main concerns of engine manufacturers, who are being confronted more and more with the sound nuisance of their turbine engines. Sources of noise in a turbine engine are numerous, but it has been found that the jet noise at the outlet from the nozzle is the noise that predominates during the stage in which an airplane is taking off. Certification authorities are becoming more and more demanding in terms of sound emissions from turbine engines, and engine manufacturers have been requested to make effort to reduce the noise from their turbine engines, and in particular the jet noise at the outlets from a nozzle.

In known manner, a confluent-flow nozzle of a turbine engine comprises a main cap, a secondary cap, and a central body, all of which are centered on the longitudinal axis of the turbine engine. The secondary cap is arranged coaxially around the primary cap so as to define an annular channel between these caps for the flow of a cold stream coming from the turbine engine. Likewise, the central body is arranged coaxially inside the primary cap so as to define an annular channel between these elements for the flow of a hot stream coming from the turbine engine.

Usually, a confluent-flow nozzle also has a mixer that is mounted at the downstream end of the primary cap so as to extend it. Such a mixer is intended to reduce jet noise at the outlet from the nozzle by forcing mixing between the cold stream and the hot stream prior to their ejection. It is well known that noise reduction can be obtained by encouraging such mixing between the two streams from the turbine engine.

Mixers for confluent-flow nozzles include in particular a so-called "daisy" mixer in which the downstream end of the primary cap of the nozzle is terminated by a substantially sinusoidal portion with inner lobes and outer lobes arranged all around the circumference of the cap.

With this type of mixer, the inner lobes form troughs that guide the cold stream radially towards the channel in which the hot stream is flowing, and the outer lobes form other troughs that guide the hot stream radially towards the channel in which the cold stream is flowing. Thus, at the outlet from the mixer, the streams coming from the turbine engine are mixed together in shear in a direction that is essentially radial. This mixing makes it possible to generate turbulence about an axis of rotation that is generally axial and of intensity that depends mainly on the ejection conditions of the streams (bypass ratio of the turbine engine, shear between the hot and cold streams) and on the conditions with which the bottoms of the lobes of the mixer are fed.

Unfortunately, the intensity of the turbulence created by a mixer of this type is not always sufficient for obtaining genuinely effective mixing between the cold and hot streams, thereby putting a limit on the reduction of the noise levels of the resulting jet, in particular the jet that is obtained during airplane takeoff stages.

OBJECT AND SUMMARY OF THE INVENTION

A main object of the present invention is thus to mitigate such drawbacks by proposing a daisy-type mixer serving to improve mixing between the cold stream and the hot stream in order to reduce the sound nuisance from the turbine engine.

This object is achieved by a mixer for a confluent-flow nozzle of a turbine engine, the mixer comprising an annular cap designed to be centered on a longitudinal axis of the nozzle and having a stationary upstream portion and a downstream portion that is movable in rotation about the longitudinal axis relative to the stationary portion, the movable portion of the cap terminating at its downstream end in inner lobes alternating circumferentially with outer lobes, the mixer also comprising means for imparting reciprocating rotary motion to the movable portion of the cap.

Imparting reciprocating rotary motion to the portion of the mixer cap that has lobes serves to add an azimuth component to the mixing between the streams coming from the turbine engine. In particular, this rotary motion generates speed gradients in the stream flows producing an effect that is made greater by the radial speed difference along the lobes of the mixer. Thus, mixing between the cold and hot streams is encouraged, thereby having the effect of making the flow at the outlet from the nozzle more homogenous and closer to the flow of a jet of the single-stream type. From a sound point of view, adding this azimuth component to the mixing between the streams makes it possible to reduce the noise from the jet at low frequencies without any corresponding increase in noise levels at high frequencies.

Furthermore, such a system for imparting reciprocating rotary motion to a portion of the mixer has an impact on the performance of the turbine engine that is comparable to the impact of a conventional mixer. Such a system is also simple to use and represents additional weight and bulk that are small.

The movable portion of the cap may be connected to the stationary portion of the cap via a rack-and-pinion type connection. Under such circumstances, the stationary portion of the cap may have a rotary electric motor coupled to a pinion meshing with a rack secured to the movable portion of the cap.

Preferably, the angular amplitude of the reciprocating rotary motion of the movable portion of the cap corresponds substantially to the width of one lobe. Such an amplitude suffices to generate an azimuth component to the mixing between the streams that suffices to destroy the mixing layer between the streams.

The frequency of the reciprocating rotary motion of the movable portion of the cap advantageously lies in the range 0.1 hertz (Hz) to 10 Hz, and is preferably 1 Hz.

The invention also provides a confluent-flow nozzle for a turbine engine that includes a mixer as defined above.

The invention also provides a turbine engine that includes a confluent-flow nozzle fitted with a mixer as defined above.

The invention also provides a method of controlling a mixer as defined above, wherein the movable portion of the cap is caused to perform reciprocating rotary motion at least during a takeoff stage. Preferably, the reciprocating rotary motion of the movable portion of the cap is deactivated during a cruising stage, the mixer then behaving like a conventional mixer.

BRIEF DESCRIPTION OF THE DRAWINGS

Other characteristics and advantages of the present invention appear from the following description made with reference to the accompanying drawings that show embodiments having no limiting character. In the figures.

DETAILED DESCRIPTION OF THE INVENTION

Figure 1:
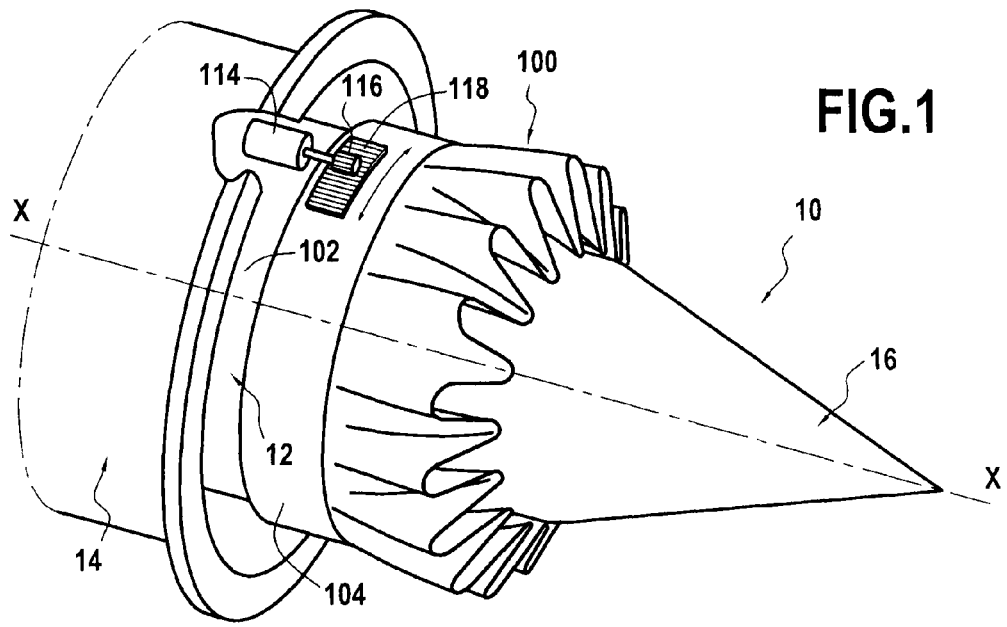
FIG. 1 is a diagrammatic perspective view of a confluent-flow nozzle fitted with a mixer of the invention.

FIG. 1 is a diagram of a confluent-flow nozzle 10 of a bypass turbine engine fitted with a mixer in accordance with the invention.

The nozzle 10 is axially symmetric relative to its longitudinal axis X-X and is typically formed by a primary annular cap 12, a secondary annular cap 14, and a central annular body 16, all three of which are centered on the longitudinal axis X-X of the nozzle.

In particular, the central body 16 is arranged inside the primary cap 12, being coaxial therewith, and it terminates in a substantially conical portion. The secondary cap 14 is arranged around the primary cap 12, and is coaxial therewith.

In the description below, the terms "inner" and "outer" designate an element of the mixer or of the nozzle that is respectively closer to or further from the longitudinal axis X-X of the nozzle.

Figure 2:
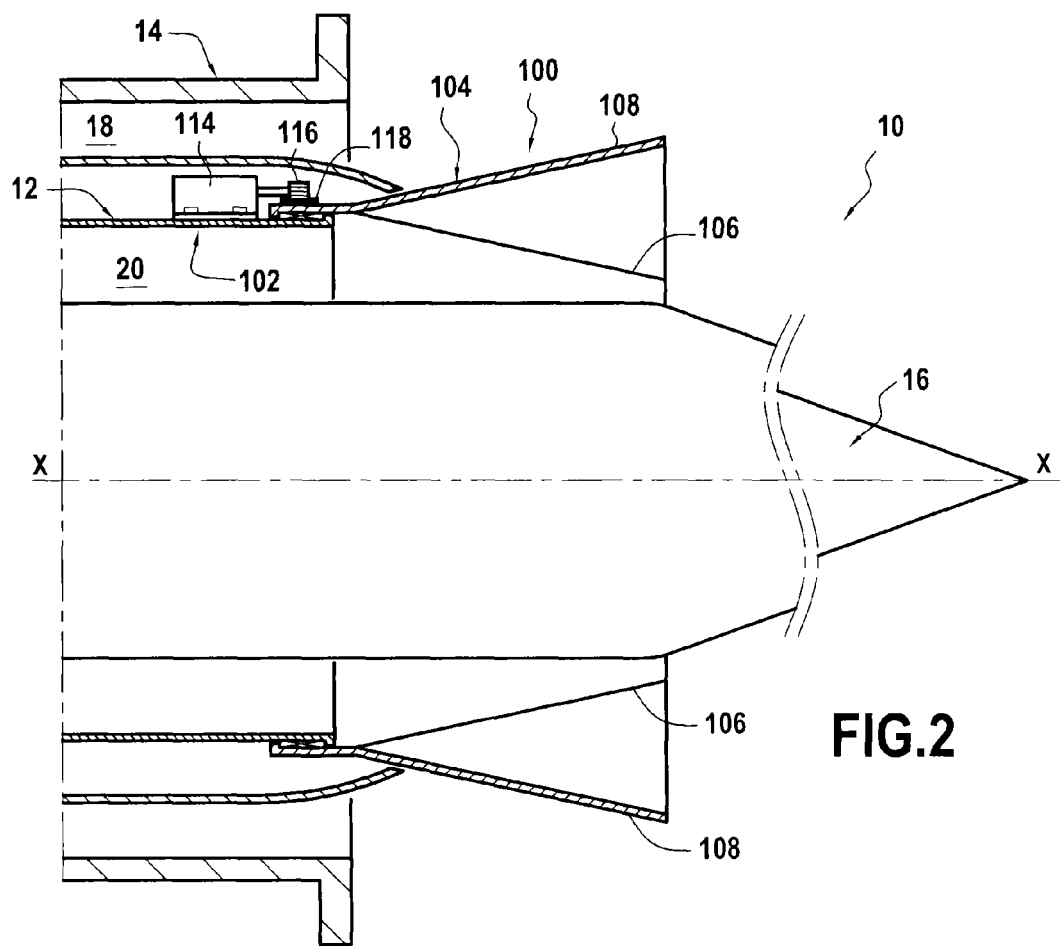
FIGS. 2 and 3 are views of the FIG. 1 mixer, respectively in longitudinal section and in radial section.

As shown in FIG. 2, the coaxial assembly of the elements of the nozzle 10 makes it possible firstly to define a first annular channel 18 between the primary and secondary caps 12 and 14 for passing the flow of an outer gas stream from the turbine engine and referred to as the bypass or cold stream, and also to define a second annular channel 20 between the primary cap 12 and the central body 16 for the flow of an inner gas stream coming from the turbine engine and referred to as the core stream or the hot stream.

The core and bypass streams flowing in these two annular channels 18 and 20 mix together in a mixer 100 mounted at the downstream end of the primary cap 12 so as to extend it.

According to the invention, the mixer 100 of the nozzle has an upstream portion 102 that is stationary and a downstream portion 104 that is movable in rotation about the longitudinal axis X-X of the nozzle relative to the stationary portion 102.

The rotary motion of the movable portion 104 of the mixer is reciprocating motion, i.e. it alternates between turning in one direction and turning in the opposite direction.

The movable portion 104 of the mixer is terminated at its downstream end by a substantially sinusoidal portion that defines inner lobes 106 that alternative circumferentially with outer lobes 108 (the mixer may be said to have a "daisy-shape").

The inner and outer lobes 106 and 108 of the mixer are arranged in alternation and they are regularly distributed around the entire circumference of the movable portion 104. By way of example they are 16 in number (for each type of lobe).

As shown in FIG. 2, the inner lobes 106 project radially inwards from the primary cap 12, i.e. they penetrate into the second flow channel 20 for the hot stream, while the outer lobes 108 project radially outwards from the primary cap 12, i.e. they penetrate into the first flow channel 18 for the hot stream.

Furthermore, the modes of the mixer all extend the same distance along the longitudinal axis X-X of the nozzle. Nevertheless, the invention also applies to mixers in which the lobes are of different lengths (in the longitudinal direction).

Figure 3:
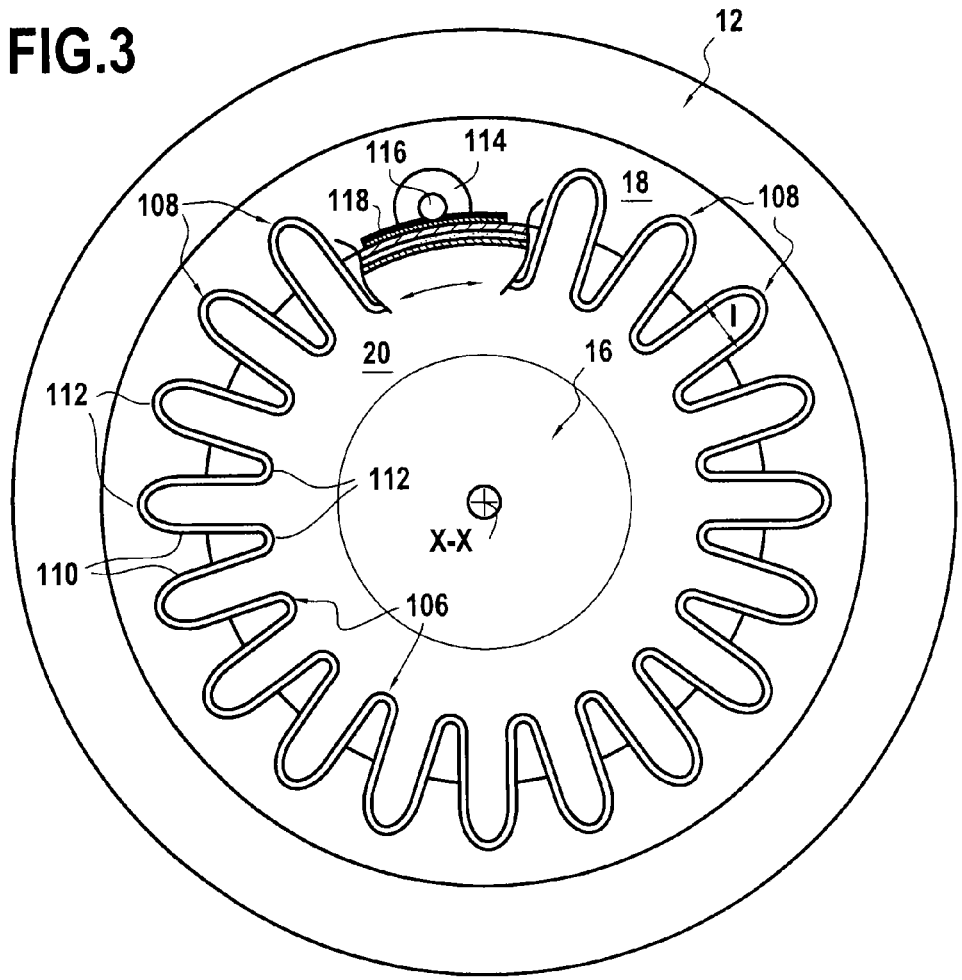

As shown more precisely in FIG. 3, the inner lobes 106 and the outer lobes 108 are each formed by a pair of walls 110 that are substantially plane, extending in directions that are substantially radial, that are spaced apart from one another in the circumferential direction, and that are connected together on the inside (for the inner lobes) and on the outside (for the outer lobes) by curvilinear arches 112.

It should be observed that the radial walls of a given outer lobe 108 radially extend the radial walls of two inner lobes 106 that are immediately adjacent thereto (and vice versa).

Thus, each inner lobe 106 forms an inner trough (or duct) serving to guide the cold stream flowing in the first channel 18 of the nozzle inwards, i.e. the cold stream traveling along said inner troughs is directed radially towards the longitudinal axis X-X of the nozzle in order to mix with the hot stream flowing along the second channel 20 of the nozzle.

Likewise, each outer lobe 108 forms an outer trough (or duct) along which the hot stream flowing in the second channel 20 of the nozzle is guided radially outwards, i.e. the hot stream flowing along such outer troughs is directed towards the first channel 18 of the nozzle in order to mix with the cold stream flowing therein.

As a result, mixing takes place between the cold stream flowing in the first channel 18 and the hot stream flowing in the second channel 20. This mixing, which serves in particular to reduce the jet noise of the nozzles, takes place in a direction that is generally radial. This is due to the particular shape of the mixer with its lobes that penetrate radially into the respective flow channels of the cold and hot streams.

Furthermore, the movable portion 104 of the mixer having lobes is suitable for pivoting about the longitudinal axis X-X of the nozzle relative to the stationary portion 102 with back-and-forth reciprocating motion (i.e. alternating from turning in one direction to turning in the opposite direction). Thus, the movable portion of the mixer is fastened on the stationary portion by a pivot connection.

In the embodiment of FIG. 2, the movable portion 104 of the mixer is connected to the stationary portion 102 via a rack-and-pinion type connection. For this purpose, the stationary portion 102 of the mixer has a rotary motor 114 that is coupled to a pinion 116 meshing with a rack 118 that is secured to the movable portion of the mixer.

In this embodiment, the motor 114 reciprocates (in the sense that it periodically changes its direction of rotation). This "reciprocating" motor may be electrically powered (i.e. an electric actuator having the ability to deliver torque in opposite directions for performing back-and-forth motion), hydraulically powered (i.e. a piston movable in translation or a rotary piston with hydraulic power being transmitted from one compartment to another in order to deliver the force needed for the back-and-forth motion), pneumatically powered (i.e. an actuator using a source of pneumatic pressure, e.g. taken from the compressor of the turbine engine), or mechanically powered (i.e. using power taken from mechanical torque transmitted by the turbine).

Naturally, it is possible to envisage using other types of pivot connection between the movable portion and the stationary portion of the mixer so as to enable the movable portion to perform reciprocating rotary motion relative to the stationary portion.

Specifically, instead of a motor that delivers reciprocating motion, provision may be made to have recourse to a motor that operates continuously in one direction (i.e. having only one direction of rotation) and to add a crank and connecting rod system between the motor and the movable portion of the mixer in order to transform the continuously rotating motion of an electric motor into reciprocating rotary motion of the movable portion of the mixer.

Figure 4:
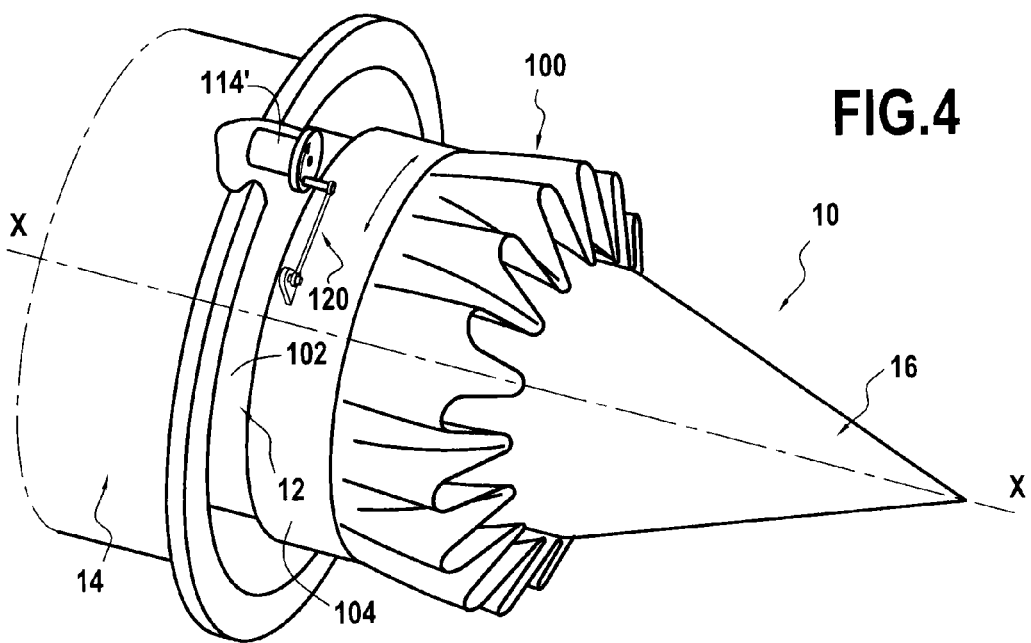
FIG. 4 is a diagrammatic view of a mixer in a variant embodiment.

FIG. 4 is a diagrammatic view of such an embodiment in which the motor 114' that performs continuous motion is coupled to the movable portion 104 of the mixer by a crank and connecting rod 120 so as to transform the continuous rotary motion of the motor 114' into back-and-forth reciprocating rotary motion of the movable portion of the mixer.

Preferably, the angular amplitude of the reciprocating rotary motion of the movable portion 104 of the mixer corresponds substantially to an outer lobe 108 moving substantially through the width l of a lobe (cf. FIG. 3). There is therefore no need for the rack 118 that is secured to the movable portion of the mixer to extend circumferentially over a distance that is significantly longer than the width l of a lobe.

The reciprocating frequency of the movable portion 104 of the mixer lies in the range 0.1 Hz to 10 Hz, and is preferably about 1 Hz.

These values for amplitude and frequency of the reciprocating motion of the movable portion of the mixer make it possible to add an azimuth component to the mixing between the cold and hot streams (which takes place essentially in a radial direction as explained above). Adding such an azimuth component increases the effectiveness of the mixing between the streams, thereby correspondingly reducing jet noise.

Furthermore, it should be observed that imparting reciprocating rotary motion to the movable portion of the mixer is preferably performed at least during a stage of airplane takeoff (where the jet noise at the outlet from the nozzle is the predominant noise) and is deactivated during a cruising stage (with the mixer then behaving like a conventional mixer).

What is claimed is:

1. A mixer for a confluent-flow nozzle of a turbine engine, the mixer comprising:
    an annular cap designed to be centered on a longitudinal axis of the confluent-flow nozzle, the annular cap having a stationary upstream portion and a downstream portion that is movable in rotation about the longitudinal axis relative to the stationary portion, a downstream end of the movable portion of the annular cap terminating in inner lobes alternating circumferentially with outer lobes; and
    a reciprocating rotary motion imparting mechanism which imparts reciprocating rotary motion to the movable portion of the cap.

2. The mixer according to claim 1, wherein the movable portion of the annular cap is connected to the stationary portion of the annular cap via a rack-and-pinion type connection.

3. The mixer according to claim 2, wherein the stationary portion of the annular cap has a rotary electric motor coupled to a pinion meshing with a rack secured to the movable portion of the annular cap.

4. The mixer according to claim 1, wherein an angular amplitude of the reciprocating rotary motion of the movable portion of the annular cap corresponds substantially to a width of one lobe.

5. The mixer according to claim 1, wherein a frequency of the reciprocating rotary motion of the movable portion of the annular cap lies in the range 0.1 hertz (Hz) to 10 hertz (Hz).

6. The mixer according to claim 5, wherein the frequency of the reciprocating rotary motion of the stationary portion of the annular cap is 1 hertz (Hz).

7. A confluent-flow nozzle for a turbine engine including a mixer according to claim 1.

8. A turbine engine including a confluent-flow nozzle according to claim 7.

9. The mixer according to claim 1, wherein the inner lobes and the outer lobes are each formed by a pair of walls extending in a substantially radial direction, being spaced apart in a circumferential direction, and being connected by arches.

10. The mixer according to claim 9, wherein the arches of the inner lobes are connected at radially inner ends of the walls.

11. The mixer according to claim 9, wherein the arches of the outer lobes are connected at radially outer ends of the walls.

12. A method of controlling a mixer according to claim 1, comprising:
    causing the movable portion of the annular cap of the mixer to perform reciprocating rotary motion at least during a takeoff stage.

13. The method according to claim 12, wherein the reciprocating rotary motion of the movable portion of the annular cap of the mixer is deactivated during a cruising stage.

* * * * *